(12) United States Patent  
Wang

(10) Patent No.: US 7,206,198 B2
(45) Date of Patent: Apr. 17, 2007

(54) PORTABLE COMPUTER WITH HANDLE-CUM-STAND

(75) Inventor: Fu-Min Wang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 64 days.

(21) Appl. No.: 11/143,420

(22) Filed: Jun. 2, 2005

(65) Prior Publication Data

US 2006/0034045 A1    Feb. 16, 2006

(30) Foreign Application Priority Data

Aug. 11, 2004   (CN) ................ 2004 2 0082913

(51) Int. Cl.
*G06F 1/16* (2006.01)
(52) U.S. Cl. .................... 361/683; 312/223.1
(58) Field of Classification Search ............. None
See application file for complete search history.

(56) References Cited

U.S. PATENT DOCUMENTS

| 4,858,162 | A | * | 8/1989 | Kieffer et al. ............. 361/683 |
| D305,883 | S | * | 2/1990 | Burton ...................... D14/324 |
| 4,969,830 | A |   | 11/1990 | Daly et al. |
| 5,011,198 | A | * | 4/1991 | Gruenberg et al. ............ 292/41 |
| 5,235,495 | A | * | 8/1993 | Blair et al. ................. 361/680 |
| 5,293,300 | A | * | 3/1994 | Leung ....................... 361/683 |
| 5,323,290 | A | * | 6/1994 | Blair et al. ................. 361/681 |
| 5,375,076 | A | * | 12/1994 | Goodrich et al. ........... 361/681 |
| 5,642,258 | A | * | 6/1997 | Barrus et al. ............... 361/683 |
| D430,156 | S | * | 8/2000 | Yamada .................... D14/328 |
| 6,097,592 | A | * | 8/2000 | Seo et al. .................. 361/683 |
| 6,115,883 | A | * | 9/2000 | Um ............................ 16/405 |

FOREIGN PATENT DOCUMENTS

FR    2799017 A1 *  3/2001

* cited by examiner

*Primary Examiner*—Lisa Lea-Edmonds
(74) *Attorney, Agent, or Firm*—Morris Manning & Martin LLP; Tim Tinghang Xia, Esq.

(57) ABSTRACT

A portable computer includes a main body (10) and a handle (30). The handle can be used to serve as both a carrying handle for the computer and as a stand for holding the computer in a convenient position for use on a desk. A pair of grooves (13) is defined in two opposite sides of the rear portion of the main body, and a front end of each groove is bounded by an inclined wall (17). A slot (35) is defined in each of the two ends of the handle. A fastener is inserted through a corresponding stepped hole and slot, and engaged in a corresponding fixing hole.

18 Claims, 5 Drawing Sheets

PORTABLE COMPUTER WITH HANDLE-CUM-STAND

BACKGROUND OF THE INVENTION

1. Field of the Invention

The present invention relates to a portable computer with a handle that can double as a stand for the portable computer.

2. Prior Art

Portable computers generally come with a carrying case at the time of purchase. The portable computer is placed inside the carrying case so that it can be transported from one place to another. Although users utilize such a carrying case when transporting their portable computers long distances, it is common for a user to carry the portable computer alone when moving the computer only a short distance.

Carrying cases for portable computers have several drawbacks. For example, a carrying case adds extra weight and bulk to the portable computer, and increases the overall cost of the portable computer. Furthermore, users want to avoid the complicated process of locating the carrying case, placing the portable computer therein, and fastening the carrying case when carrying the portable computer over short distances. Instead, the user simply wants to carry the portable computer by itself. In such cases, the user may drop or otherwise accidentally damage the portable computer.

To circumvent these problems, some portable computers have been provided with a handle directly attached thereto. However, because the handle protrudes from a main body of the portable computer, the handle is liable to obstruct convenient use of the portable computer. In addition, the handle can detract from the overall aesthetic attractiveness of the portable computer.

A new type of hand held computer is disclosed in U.S. Pat. No. 5,133,076 entitled "Hand Held Computer." Such computer has a low profile, is light in weight, and is easily carried on one arm in much the same way that a clipboard is carried. This leaves the user's other hand free for writing on the screen of the computer with a stylus.

The hand held computer can also be connected to an expansion module for further functionality and/or increased power, as disclosed in U.S. Pat. No. 4,969,830 entitled "Connection Between Portable Computer Components." With the two computer components thus connected, the resulting computer unit is still portable although somewhat bulkier.

With such kind of hand held computer, and certain other relatively low profile computers or components, there is generally a need for a convenient and safe carrying arrangement for taking the computer out into the field. In the case of a tablet-type computer, there is also a need for a suitable means to set the computer up on a desk for convenient viewing of the display screen thereof while using a detachable keyboard.

SUMMARY

A main objective of the present invention is to provide a portable computer with a handle which can serve as both a carrying handle for the computer and as a stand for holding the computer in a convenient position for use on a desk.

To accomplish the above objective, a portable computer in accordance with a first preferred embodiment of the present invention comprises: a main body having walls in two sides of a rear portion; a handle mounted on said main body having a handle body, catch portions at each end of said handle.

Further, a portable computer in accordance with a second preferred embodiment of the present invention comprises: a main body having walls in two sides of a rear portion, the walls slants slightly forwardly from a top thereof to a bottom thereof; a handle mounted on said main body having a handle body, catch portions at each end of said handle, wherein each catch portion has a slot; and fasteners traverse the slot to mount the handle to two sides of the main body.

Other objects, advantages and novel features of the present invention will be drawn from the following detailed description with reference to the attached drawings, in which:

DETAILED DESCRIPTION OF THE INVENTION

Figure 1:
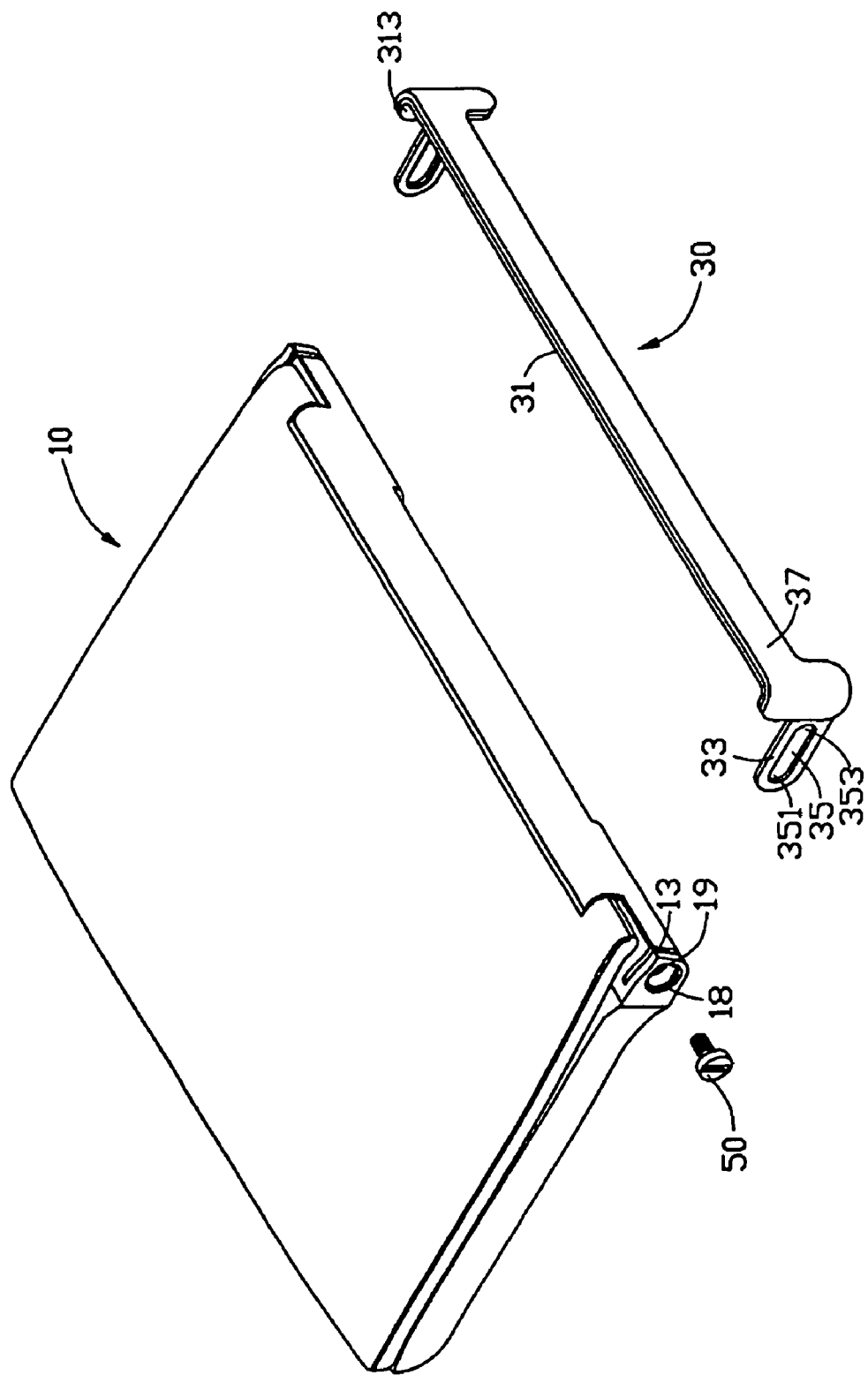
FIG. 1 is an exploded, isometric view of a portable computer with a handle according to a first preferred embodiment of the present invention.
Figure 2:
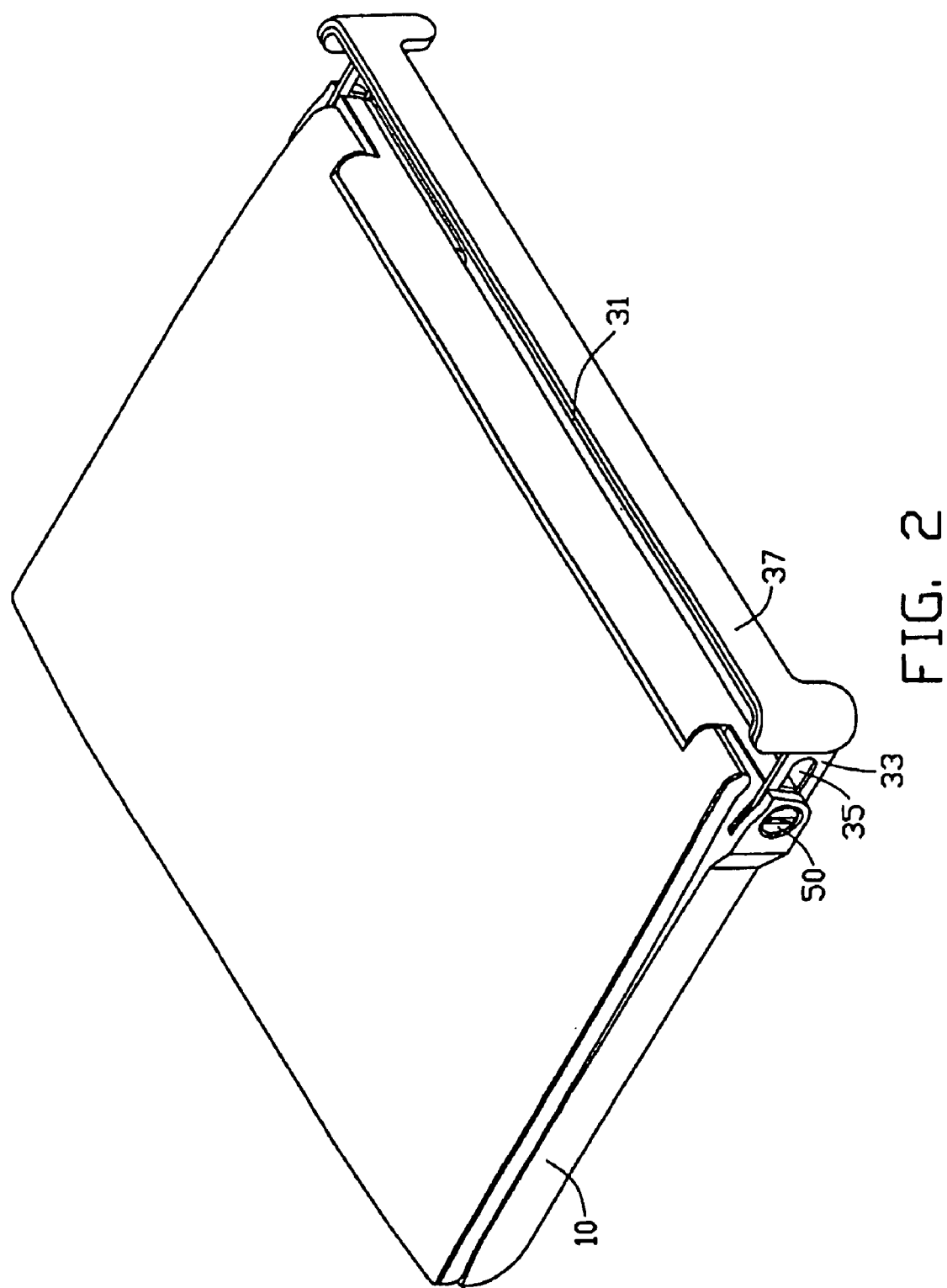
FIG. 2 is an assembled view of the portable computer of FIG. 1, showing the handle in an extended position for a user to carry the portable computer.
Figure 3:
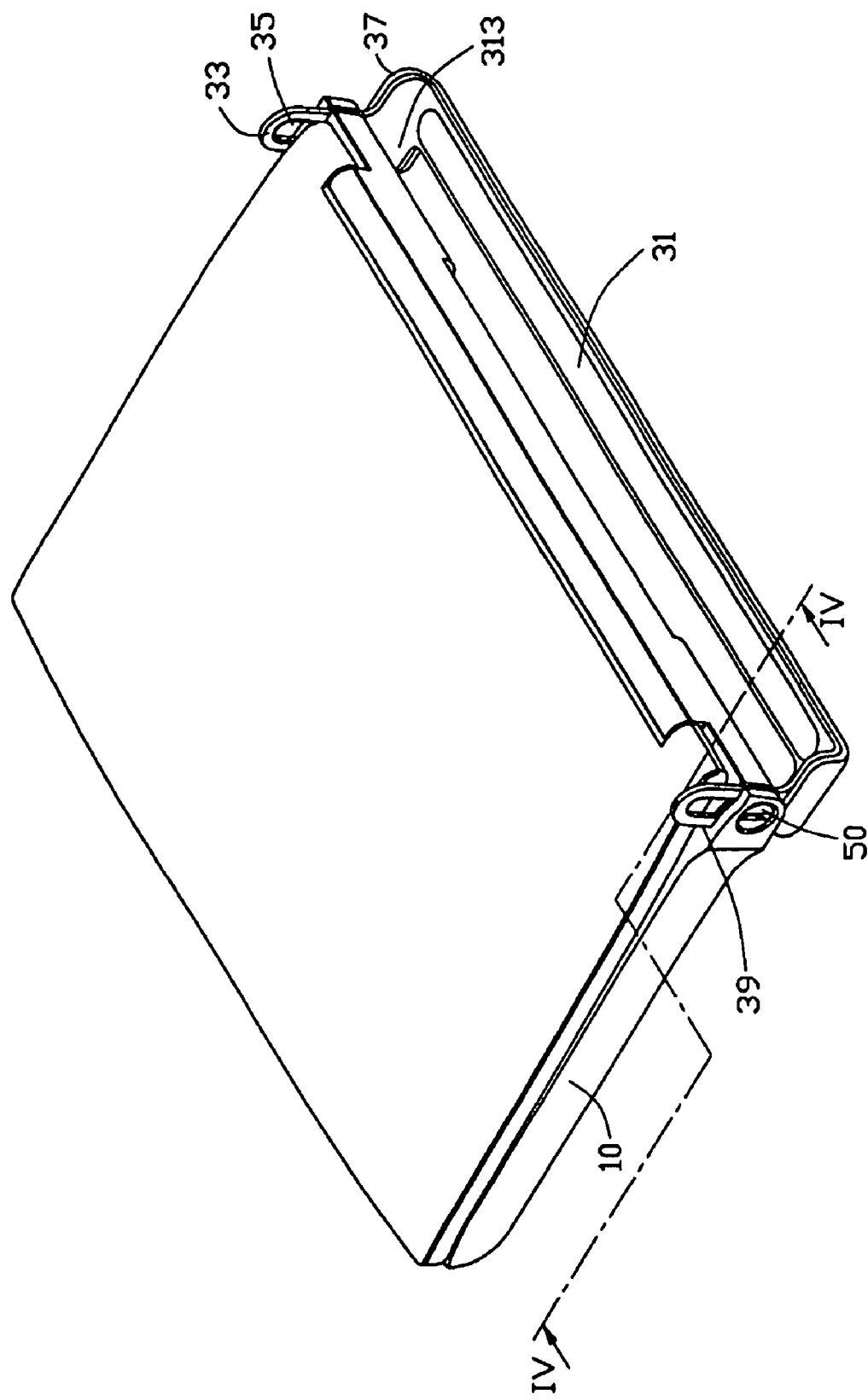
FIG. 3 is similar to FIG. 2, but showing the handle moved to a position where it can support the portable computer on a supporting surface.
Figure 4:
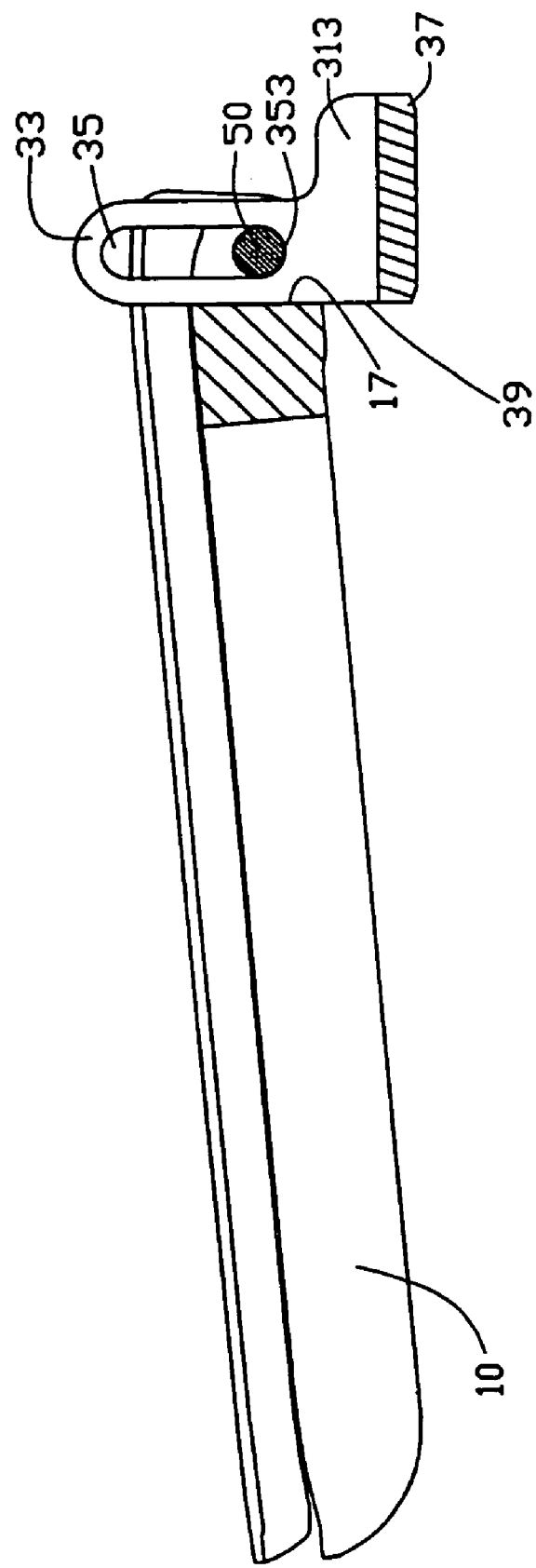
FIG. 4 is a side elevation view taken along line IV—IV of FIG. 3.

Referring to FIGS. 1–4, a portable electronic device like a portable computer includes a main body 10 and a handle 30 as a functional part thereof. The handle 30 is mounted to a rear portion of the main body 10.

A pair of grooves 13 is defined in two opposite sides of the rear portion of the main body 10. A front end of each groove is bounded by an inclined wall 17. The wall 17 slants slightly forwardly from a top thereof to a bottom thereof. A stepped hole 18 is defined in each of ends of the rear portion of the main body 10, the stepped hole 18 communicating with one side of the corresponding groove 13. A step portion (not labeled) of the rear portion of the main body 10 at each stepped hole 18 is perforated, to facilitate engagement of the head of a corresponding fastener 50 thereat. A fixing hole 19 is defined in each of end portions of the rear portion of the main body 10, the fixing hole 19 communicating with an opposite side of the corresponding groove 13. Each stepped hole 18 and its corresponding fixing hole 19 are collinear. The handle 30 is generally U-shaped, and includes a handle body 31, two opposite enlarged end portions 313, and two opposite catch portions 33. Each catch portion 33 is at a respective end of the handle 30, and defines a slot 35. The slot 35 comprises a first end 351 and a second end 353. A bumper 37 is fixed to and covers outer faces of the handle body 31 and the end portions 313.

When mounting the handle 30 to the main body 10, the catch portions 33 are inserted into the grooves 13 of the main body 10. The slots 35 of the catch portions 33 are aligned with the stepped holes 18 and the fixing holes 19. Then each fastener 50 (such as a bolt in the present embodiment) is inserted through the corresponding stepped hole 18 and slot 35, and engaged in the corresponding fixing hole 19. The head of the fastener 50 engages on the rear portion of the main body 10 at the corresponding perforations. The handle 30 is thus mounted to two sides of the main body 10.

When the handle 30 serves as a carrying handle for the portable computer as one of its functions, a user takes hold of the handle 30 and slides it away from the main body 10. Because the handle 30 is much smaller and lighter than the main body 10, the handle easily moves away from the main body 10. Further, due to inertia and/or gravitational force acting on the rear portion of the main body 10, the fasteners 50 easily move into the first ends 351 of the slots 35 of the handle 30, thereby readily providing sufficient space between the handle 30 and the main body 10 for the user to easily take firm hold of the handle 30.

When the handle 30 serves as a stand for the portable computer as another of its functions, the user can turn the handle 30 down and toward a front of the portable computer. If this is done when the main body 10 is resting on a supporting surface such as a desk, due to gravitational force acting on the main body 10, the fasteners 50 easily fall into the second ends 353 of the slots 35 of the handle 30. Thus the portable computer rests on the desk, and a fold-up display screen of the portable computer can be viewed at an appropriate angle. With the portable computer resting on the desk, flat sides 39 of the catch portions 33 abut against the flat walls 17 in the grooves 13, thereby preventing the handle 30 from turning in either direction. Further, the end portions 313 augment the area of the handle body 31, so that the handle 30 has a larger area that contacts the desktop. Moreover, the bumper 37 increases the friction between the handle 30 and the desk. All these features help ensure that the handle 30 and thus the whole portable computer can stay steadily in place on the desk.

Figure 5:
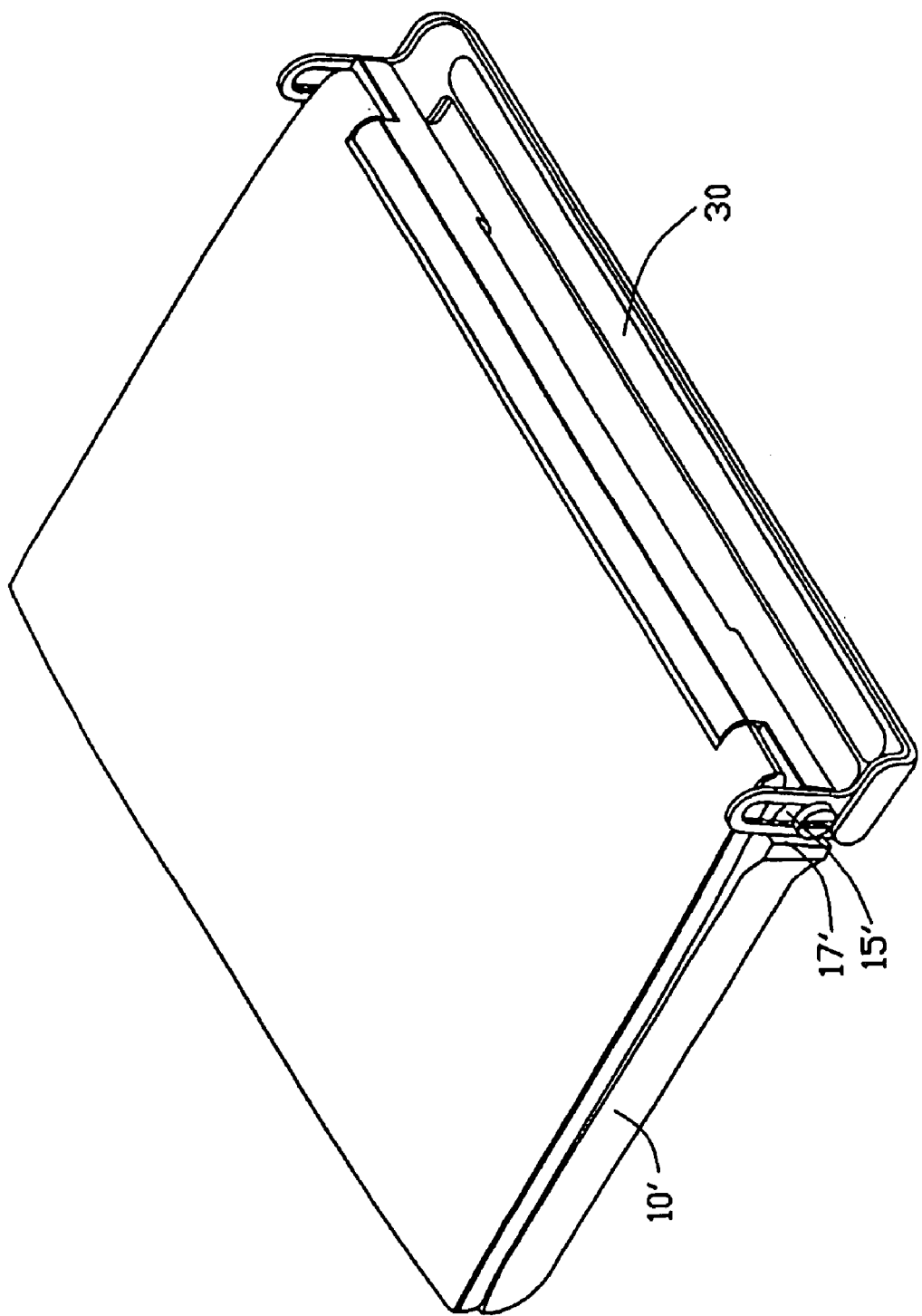
FIG. 5 is an isometric view of a portable computer with a handle according to a second preferred embodiment of the present invention, showing the handle in a position where it can support the portable computer on a supporting surface.

FIG. 5 is an isometric view of a portable computer with a handle 30 according to a second preferred embodiment of the present invention. Compared to the portable computer of the first preferred embodiment, the distinguishing features are that a rear portion of a main body 10' has two opposite side walls 15', and two opposite walls 17' adjoining the side walls 15'.

Although the present invention has been specifically described on the basis of preferred embodiments, the invention is not to be construed as being limited thereto. Various changes or modifications may be made to the embodiment without departing from the scope and spirit of the invention.

I claim:

1. A portable computer comprising:
a main body having a pair of walls at two sides of a rear portion, the two sides of the rear portion defining a pair of grooves, a front end of each groove being bounded by a corresponding one of the walls;
a handle mounted to the main body at the rear portion, the handle having a handle body, and a pair of catch portions at opposite ends thereof, the catch portions being engaged in and movable in the grooves of the main body.

2. The portable computer as claimed in claim 1, wherein each of the walls slants slightly forwardly from a top thereof to a bottom thereof.

3. The portable computer as claimed in claim 1, wherein each of the two sides of the rear portion of the main body defines a stepped hole and a fixing hole in communication with respective opposite sides of a corresponding one of the grooves.

4. The portable computer as claimed in claim 3, further comprising a pair of fasteners, wherein the handle is generally U-shaped, each of the catch portions has a slot, and each fastener extends through a corresponding stepped hole and slot and is engaged in a corresponding fixing hole.

5. The portable computer as claimed in claim 1, wherein the handle further includes two end portions.

6. The portable computer as claimed in claim 5, wherein a bumper is fixed to and covers outer faces of the handle body and the end portions.

7. A portable computer comprising:
a main body having a pair of walls in two sides of a rear portion thereof, each of the walls slanting slightly forwardly from a top thereof to a bottom thereof, the two sides of the rear portion defining a pair of grooves, a front end of each groove being bounded by a corresponding one of the walls;
a handle mounted to the main body, the handle having a handle body, and a pair of catch portions at opposite ends thereof, the catch portions being engaged in and movable in the grooves of the main body, each catch portion defining a slot; and
a pair of fasteners extending through the slots and mounting the handle to the two sides of the rear portion of the main body.

8. The portable computer as claimed in claim 7, wherein each of the two sides of the rear portion of the main body defines a stepped hole and a fixing hole in communication with respective opposite sides of the corresponding groove.

9. The portable computer as claimed in claim 8, wherein each fastener extends through a corresponding stepped hole and the corresponding slot and is engaged in a corresponding fixing hole.

10. The portable computer as claimed in claim 7, wherein the handle further has two end portions.

11. The portable computer as claimed in claim 10, wherein a bumper is fixed to and covers outer faces of the handle body and the end portions.

12. A portable electronic device comprising:
a main body of said portable electronic device;
a functional part movably attachable to said main body and movable between a first position to perform a first function thereof and a second position to perform a second function thereof, said functional part being substantially closer to said main body in said first position to perform said first function than in said second position to perform said second function; and
a bumper covering outer faces of said functional part for increasing friction in order to facilitate performance of one of said first and second functions of said functional part.

13. The portable electronic device as claimed in claim 12, wherein said functional part is a handle capable of being carried by hand as said second function in said second position thereof and capable of being used as a stand of said portable electronic device as said first function in said first position thereof.

14. The portable electronic device as claimed in claim 12, wherein said first position of said functional part to perform said first function thereof is substantially perpendicular to said second position of said functional part to perform said second function thereof.

15. The portable electronic device as claimed in claim 12, wherein said main body has a pair of walls at two sides of a rear portion of said main body, said two sides of said rear portion of said main body define a pair of grooves, and a front end of each groove is bounded by a corresponding one of said pair of walls.

16. The portable electronic device as claimed in claim 15, wherein said functional part has a pair of catch portions at opposite ends thereof, and said catch portions are engaged in and movable in said grooves of said main body.

17. The portable electronic device as claimed in claim 16, wherein each of said two sides of said rear portion of said main body defines a stepped hole and a fixing hole in communication with respective opposite sides of a corresponding one of said grooves.

18. The portable electronic device as claimed in claim 17, further comprising a pair of fasteners, wherein said functional part is generally U-shaped, each of said catch portions of said functional part defines a slot, and each fastener extends through a corresponding stepped hole and slot, and is engaged in a corresponding fixing hole.

* * * * *